2,921,080

PROCESS FOR MAKING 5-CYANO-2-ALLYL-PYRROLIDINES AND PRODUCTS THEREFROM

Sydney Archer, Delmar, Thomas R. Lewis, Jr., Albany, and Bernard L. Zenitz, Delmar, N.Y., assignors to Sterling Drug Inc., New York, N.Y., a corporation of Delaware No Drawing. Application November 21, 1956
Serial No. 623,528

7 Claims. (Cl. 260—313)

This invention relates to processes for the preparation of substituted pyrrolidines. More particularly, it is concerned with the ring cleavage of a 3-halotropane, where the halogen is a middle halogen, with an alkali cyanide and the 2-allyl-5-cyano-1-methyl-pyrrolidine thereby obtained, as well as derivatives of such compound.

The replacement of a halogen atom by the cyanide radical is a well known and widely used synthetic procedure which generally proceeds readily and in a predictable way. The reactive cyano group thus introduced provides nitriles which can be converted by standard procedures to acids, amides, amines, esters and ketones and hence furnishes compounds having value as intermediates. It has now been found that a highly unusual reaction takes place when 3-halotropane is reacted with an alkali cyanide. Surprisingly the product obtained is not the expected 3-cyanotropane but the hitherto unknown 2-allyl-5-cyano-1-methylpyrrolidine, formed by cleavage of the tropane ring. That such a cleavage occurs is even more surprising in view of the fact that the epimeric 3-halopseudotropane reacts readily with potassium cyanide to give the expected 3-cyanotropane.

Although 3-chlorotropane is preferred as a starting reactant, the halogen of the 3-halotropane can be either middle halogen, i.e., chlorine and bromine.

The process can be illustrated by the following equation:

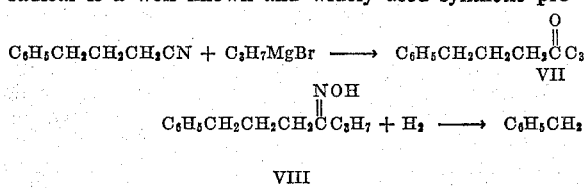

The structure of I was proven by conducting the following series of reactions:

The reaction of I with the Grignard reagent gave II, the infra-red absorption spectra of which showed no nitrile band but did show the bands associated with an aromatic ring. The overall reaction therefore was the replacement of a cyanide group with a phenyl group, a behavior characteristic of the action of Grignard reagents on α-dialkylamino nitriles, a structural feature present in I.

The reduction of II over platinum oxide gave the dihydro base III which was converted to the methiodide IV by reaction with methyl iodide. After converting IV to the hydroxide with moist silver oxide it was subjected to the Hofmann degradation to give an amine whose ultra violet light absorption spectrum showed an absorption at 253 mμ and thus supported the styrene system shown in V. The fact that V was an amine showed that IV, the parent substance, must be cyclic.

Reduction of V caused the strong absorption bands to disappear and furnished VI which was characterized as the picrate. The structure of the open chain base VI was confirmed by an independent synthesis as shown in the following equations:

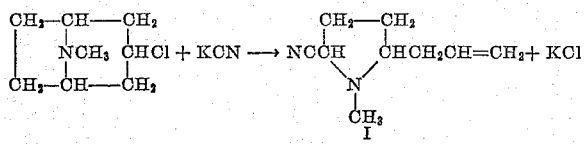

The action of n-propylmagnesium bromide on γ-phenyl-butyronitrile gave the heptanone VII which was converted into the oxime VIII. Reduction of VIII with lithium aluminum hydride gave the primary amine IX which gave the methylated base VI when methylated under Eschweiler-Clarke conditions. The picrate, prepared from this synthetic sample, did not depress the melting point of the sample resulting from the degradation of I, gave an identical infra-red spectrum and was crystallographically similar thus establishing the identity of the two picrates.

The novel process of the invention is carried out by heating a 3-halotropane with an alkali cyanide. The reaction is carried out at a temperature between about 50° C. and 125° C. in a lower-alkanol-water solvent, and if a solvent is selected that boils in this range, as is preferred, it is convenient to conduct the reaction at the reflux temperature of the solvent. After the removal of inorganic salts the product is isolated in pure form by distillation.

It can be seen from the above that the invention comprehends a member of the group consisting of compounds having the formula:

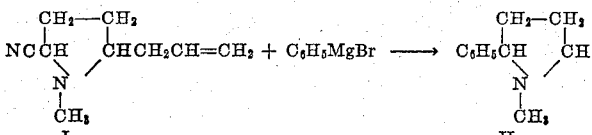

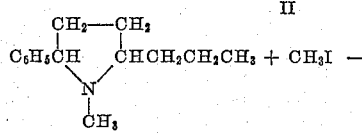

wherein R is a member of the group consisting of n-propyl and allyl groups, and R' is a member of the group consisting of cyano, phenyl and carbo-lower-alkoxy radicals; and the quaternary ammonium and acid addition salts thereof.

The compounds of the invention are of value as intermediates in the preparation of hitherto unknown compounds. It has also been found by pharmacological evaluation that the compounds exhibit a variety of activities. Thus, I is a potent respiratory stimulant causing a 150–250% increase in the respiration rate of dogs. Surprisingly, the toxicity is quite low, the effective dosage being from one-fifth to one-tenth the toxic dosage. The quaternary ammonium salts, the methiodides being the preferred species, possess ganglionic blocking activity as illustrated by the finding that the methiodide of II was 22% as effective as hexamethonium in blockade of the sympathetic ganglia when measured by the carotid occlusion test in dogs. The compounds can be prepared for use as ganglionic blocking agents by means similar to those employed for conventional ganglionic blocking agents such as hexamethonium salts. The corresponding free bases and acid addition salts are useful intermediates for preparation of the quaternary salts.

The following will further illustrate the invention without however the latter being limited thereto.

EXPERIMENTAL

Preparation of 3-chlorotropane

To a stirred solution of 70.6 g. of tropine in 475 ml. of chloroform at $-10°$ to $-20°$ C. was added 130.9 g. of thionyl chloride in 475 ml. of dry chloroform over a thirty minute period. After the addition was complete the coolant was removed and the solution heated to 55–60° C. whereupon the evolution of sulfur dioxide started and the desired salt begain to separate. The mixture was kept at 60–70° C. for three hours, cooled and the salt collected by suction filtration. After drying there was obtained 53.8 g. of 3-chlorotropane hydrochloride, M.P. 239–240° C. (dec.).

Evaporation of the filtrate followed by the addition of 100 ml. of dry acetone gave an additional crop of crystals which were collected by suction filtration and dried.

The two crops were combined and recrystallized from ethyl alcohol to give 55.2 g. of pure 3-chlorotropane hydrochloride, M.P. 242–243° C. (dec.).

The addition of potassium carbonate to an aqueous solution of 75 g. of the above salt caused the separation of an oil which was dissolved in pentane, filtered and distilled to give 56 g. of 3-chlorotropane, B.P. 60–61° C. (2.0 mm.); $n^{25}=1.4998$.

The picrate prepared in ethyl alcohol melted at 218–224° C. after crystallization from ethyl alcohol.

*Analysis.*—Calcd. for $C_{14}H_{17}ClN_4O_7$: Neutral equivalent, 389. Found: Neutral equivalent, 389.

EXAMPLE 1

*2-allyl-5-cyano-1-methylpyrrolidine.*—A solution of 22.1 g. of potassium cyanide in 85 ml. of water was refluxed for five hours with a solution of 51.0 g. of 3-chlorotropane in 225 ml. of ethyl alcohol. The suspension was cooled and filtered. The filtrate was concentrated to dryness to give a mixture of an oil and inorganic salt. The oil was taken up in pentane, washed with water and distilled. There was thus obtained 40.2 g. of 2-allyl-5-cyano-1-methylpyrrolidine, B.P. 68–70° C. (2.0 mm.).

*Analysis.*—Calcd. for $C_9H_{14}N_2$: Nitrogen, 18.65; nitrogen $_{amino}$, 9.33. Found: Nitrogen, 18.35; nitrogen $_{amino}$, 9.38.

EXAMPLE 2

*2-allyl-5-carbomethoxy-1-methylpyrrolidine.*—A rapid stream of dry hydrogen chloride was passed for one hour through a solution of 40 g. of the above nitrile in 300 ml. of methanol containing 3.8 ml. of water. The solution was allowed to stand at room temperature for twenty-four hours. The ammonium chloride which separated was removed by suction filtration and the methanol solution concentrated to dryness. The residue was taken up in 75 ml. of water and the resultant solution saturated with potassium carbonate. The oil which separated was removed with chloroform and the chloroform removed by evaporation. Distillation of the residual oil gave 21.7 g. of 2-allyl-5-carbomethoxy-1-methylpyrrolidine, B.P. 67–70° C. (2.0 mm.).

*Analysis.*—Calcd. for $C_{10}H_{17}NO_2$: Carbon, 65.54; hydrogen, 9.35; nitrogen, 7.64. Found: Carbon, 65.38; hydrogen, 8.97; nitrogen, 7.59.

EXAMPLE 3

*2-allyl-1-methyl-5-phenylpyrrolidine.*—To a Grignard reagent prepared from 26.7 g. of bromobenzene and 4.6 g. of magnesium in 150 ml. of ether was added 18 g. of 2-allyl-5-cyano-1-methylpyrrolidine (Example 1) in 100 ml. of ether and the mixture heated for one hour. The ether was removed by distillation, the residue taken up in benzene and the resulting suspension was refluxed for three hours then cooled overnight. The mixture was decomposed with 120 ml. of 6 N hydrochloric acid, heated on a steam bath for two hours, cooled and allowed to separate. Three layers appeared but after the separation of the acid layer the addition of water to the top layers caused the disappearance of the middle phase. The benzene solution was extracted with dilute hydrochloric acid then discarded. The aqueous portions were made basic with ammonia and the base that separated was removed with ether. The ethereal solution was dried, the ether removed by evaporation and the residue distilled to yield a fraction, B.P. 81–90° C. (0.5 mm.). Redistillation gave 2-allyl-1-methyl-5-phenylpyrrolidine, B.P. 69–70° C. (0.1 mm.).

*Analysis.*—Calcd. for $C_{14}H_{19}N$: Carbon, 83.53; hydrogen, 9.51; nitrogen, 6.96. Found: Carbon, 83.70; hydrogen, 9.81; nitrogen, 6.84.

EXAMPLE 4

*1-methyl-2-phenyl-5-propylpyrrolidine.*—A solution of 10.4 g. of 2-allyl-1-methyl-5-phenyl-pyrrolidine (Example 3) in 200 ml. of absolute ethyl alcohol was hydrogenated in the presence of 200 mg. of Adam's platinum oxide catalyst. One equivalent of hydrogen was consumed in five minutes. The mixture was made basic, extracted with ether and the ethereal solution dried over anhydrous calcium sulfate. Evaporation of the ether and distillation of the residue gave 8.5 g. of 1-methyl-2-phenyl-5-propylpyrrolidine, B.P. 111–113° C. (4 mm.).

*Analysis.*—Calcd. for $C_{14}H_{21}N$: Nitrogen, 6.86. Found: Nitrogen, 6.90.

Preparation of 4-dimethylamino-1-phenyl-1-heptene

The 1-methyl-2-phenyl-5-propylpyrrolidine (13.3 g.) prepared as in Example 5 was covered with 50 ml. of methyl iodide. The solution warmed spontaneously and the yellow solid which separated was worked up in either of two ways depending on whether a mixture of methiodides or the two pure isomers were desired. Thus, a mixture of methiodides was obtained by evaporation of the methyl iodide followed by the successive addition and evaporation of fresh methyl iodide. Recrystallization of the residue from acetone gave 14.9 g. of 1-methyl-2-phenyl-5-propylpyrrolidine methiodide, M.P. 126–130° C. This mixture of methiodides can be used without further purification as shown below.

The pure isomeric methiodides were obtained in the following way. The above-mentioned yellow solid was collected by suction filtration, washed with acetone and dried. There was thus obtained a white crystalline material, M.P. 135–140° C. The filtrate was diluted with fresh methyliodide and allowed to stand overnight. The yellow plates which separated were collected by suction filtration and recrystallized from acetone to give white crystals, M.P. 173–174° C.

*Analysis.*—Calcd. for $C_{15}H_{20}IN$: Iodine, 36.1. Found: Iodine, 36.0.

On the basis of the differential rate of formation the trans structure was assigned to the lower melting methiodide and the cis structure to the higher melting form. Inspection of molecular models indicated that there is less hindrance to the accommodation of the quaternizing agent when the phenyl and n-propyl group are trans rather than cis.

The mixture of methiodides (M.P. 126–130° C.; 12.0 g.) was dissolved in 100 ml. of water and heated on a steam bath with silver oxide, freshly prepared from 12.6 g. of silver nitrate, for one hour. The solids which separated were collected by suction filtration and digested for fifteen minutes with 50 ml. of hot water. The aqueous extracts were evaporated at 45° C. (1 mm.). The residue was dissolved in methanol, freed of a small amount of insoluble material and distilled at a pressure of 0.3 mm. On redistillation there was obtained 4-dimethylamino-1-phenyl-1-heptene, B.P. 125–128° C. (4.0 mm.). The ultra violet absorption spectrum showed $\epsilon_{253}$ 11,650.

*Analysis.*—Calcd. for $C_{15}H_{23}N$: Nitrogen, 6.46. Found: Nitrogen, 6.44.

Preparation of 1-phenyl-4-heptanone

To a suspension of n-propylmagnesium iodide, prepared in 400 ml. of anhydrous ethyl ether from 68 g. of propyl iodide and 10.2 g. of magnesium turnings, was added dropwise a solution of 43.5 g. of γ-phenylbutyronitrile in 100 ml. of ether. The ether was removed by distillation, the residue taken up in anhydrous benzene and the mixture refluxed for three hours. The mixture was treated with 200 ml. of 6 N hydrochloric acid and refluxed for five hours after which the layers were separated and the benzene solution washed with water and dried. The benzene was removed by evaporation and the residue distilled to give 23 g. of the desired ketone, B.P. 95–108° (0.3–0.5 mm.). Redistillation gave pure 1-phenyl-4-heptanone, B.P. 96–98° C. (0.1 mm.).

*Analysis.*—Calcd. for $C_{13}H_{18}O$: Carbon, 82.06; hydrogen, 9.53. Found: Carbon, 82.07; hydrogen, 9.43.

The addition of 2,4-dinitrophenylhydrazine to 1-phenyl-4-heptanone gave a solid which was collected by suction filtration. After recrystallization from ethyl alcohol there was obtained 1-phenyl-4-heptanone 2,4-dinitrophenylhydrazone, M.P. 85–87° C.

*Analysis.*—Calcd. for $C_{19}H_{22}N_4O_4$: Nitro groups, 24.8. Found: Nitro groups, 24.3.

Preparation of 4-dimethylamino-1-phenylheptane

A. *From 4-dimethylamino-1-phenyl-1-heptene.*—The 4-dimethylamino-1-phenyl-1-heptene obtained in Example 6 was reduced in 200 ml. of 95% ethyl alcohol in the presence of 100 mg. of Adams' platinum oxide. When reduction was complete an aliquot was removed for spectral analysis ($\epsilon_{253}$ 219).

The remainder of the solution was evaporated to dryness and the residue treated with alcoholic picric acid. After three recrystallizations from ethyl alcohol the 4-dimethylamino-1-phenylheptane picrate obtained melted at 92.5–94° C. and did not depress the melting point of the authentic 4-dimethylamino-1-phenylheptane described below.

*Analysis.*—Calcd. for $C_{21}H_{28}N_4O_7$: Nitrogen, 12.49. Found: Nitrogen, 12.23.

B. *From 1-phenyl-4-heptanone.*—To 22 g. of 1-phenyl-4-heptanone, prepared as in Example 7, was added 10 g. of hydroxylamine hydrochloride in 100 ml. of pyridine and the solution was heated on a steam bath for three hours. The pyridine was removed by vacuum distillation and the residue partitioned between benzene and water. The benzene phase was washed with water and evaporated to leave 23 g. of 1-phenyl-4-heptanone oxime which was used without purification in the next step.

An ethereal solution of the crude oxime was added to 20 g. of lithium aluminum hydride in 750 ml. of dry ether and the mixture refluxed for six hours. After standing overnight the mixture was heated dropwise with 20% Rochelle salt solution and, after the vigorous reaction had subsided, stirred for several hours. The solid which precipitated was removed by suction filtration and washed with ether. The ethereal layer was separated and concentrated to 200 ml. before being repeatedly extracted with dilute hydrochloric acid. The united acid extracts were made alkaline and the oil which separated was removed with ether. After drying the solution was distilled to give 7.6 g. of 1-phenyl-4-aminoheptane, B.P. 93–95° (0.1 mm.) which was used directly in the next step without further purification.

A solution of 1-phenyl-4-aminoheptane in 14.5 ml. of 98% formic acid was treated with 17 ml. of 37% formaldehyde. After the initial vigorous reaction had subsided the solution was heated on a steam bath for five hours. The solution was concentrated under reduced pressure to leave an oily residue which was dissolved in water and made basic with sodium hydroxide solution. The oil which separated was extracted with ether and the ethereal extracts dried over anhydrous sodium sulfate. Distillation gave 5.0 g. of 4-dimethylamino-1-phenylheptane, B.P. 100–110° C. (0.1 mm.). The 4-dimethylamino-1-phenylheptane pictrate, prepared in ethyl alcohol, melted at 92.5–93° C. after two recrystallizations from ethyl alcohol. A mixed melting point with the picrate obtained in Part A showed no depression of melting point thus established the identity of the two picrates.

We claim:

1. The process for preparing a compound having the formula

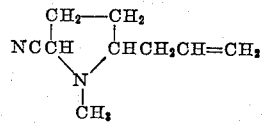

which comprises interacting a 3-halotropane, wherein halo is a middle halogen, with an alkali cyanide in a water-lower-alkanol solvent.

2. The process for preparing a compound having the formula

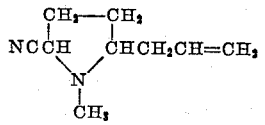

which comprises interacting 3-chlorotropane with an alkali cyanide in a water-ethyl alcohol solvent.

3. A member selected from the group consisting of compounds having the formula

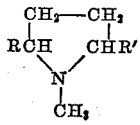

wherein R is a member selected from the group consisting of n-propyl and allyl groups and R' is a member selected from the group consisting of cyano, phenyl and carbo-lower-alkoxy groups, and the methohalide and acid addition salts thereof.

4. 2-allyl-5-cyano-1-methylpyrrolidine.
5. 2-allyl-5-carbomethoxy-1-methylpyrrolidine.
6. 2-allyl-1-methyl-5-phenylpyrrolidine methiodide.
7. 1-methyl-2-phenyl-5-propylpyrrolidine.

References Cited in the file of this patent

C.A., vol. 47, Oct.–Nov. 1953, p. 1234a.